United States Patent
Miller

(10) Patent No.: US 6,597,358 B2
(45) Date of Patent: *Jul. 22, 2003

(54) METHOD AND APPARATUS FOR PRESENTING TWO AND THREE-DIMENSIONAL COMPUTER APPLICATIONS WITHIN A 3D META-VISUALIZATION

(75) Inventor: John David Miller, Beaverton, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,997

(22) Filed: Aug. 26, 1998

(65) Prior Publication Data

US 2001/0040571 A1 Nov. 15, 2001

(51) Int. Cl.[7] ............................................... G06T 15/00
(52) U.S. Cl. ....................................... 345/427; 345/782
(58) Field of Search ............................... 345/348, 342, 345/425, 419, 355, 771, 778, 779, 782, 788, 810, 836, 848, 427

(56) References Cited

U.S. PATENT DOCUMENTS

| | | | | |
|---|---|---|---|---|
| 5,303,388 A | * | 4/1994 | Kreitman et al. ............ | 395/159 |
| 5,454,414 A | * | 10/1995 | Colson et al. ......... | 160/168.1 R |
| 5,515,486 A | * | 5/1996 | Amro et al. ................. | 395/137 |
| 5,592,195 A | * | 1/1997 | Misono et al. ............... | 345/146 |
| 5,678,015 A | * | 10/1997 | Goh ............................ | 395/355 |
| 5,880,733 A | * | 3/1999 | Horvitz et al. .............. | 345/427 |
| 6,005,579 A | * | 12/1999 | Sugiyama et al. ........... | 345/355 |
| 6,016,151 A | * | 1/2000 | Lin .............................. | 345/430 |
| 6,034,691 A | * | 3/2000 | Aono et al. .................. | 345/425 |
| 6,130,673 A | * | 10/2000 | Pulli et al. ................... | 345/428 |
| 6,229,542 B1 | * | 5/2001 | Miller ......................... | 345/358 |
| 6,317,139 B1 | * | 11/2001 | Williams ..................... | 345/634 |

* cited by examiner

Primary Examiner—M. Zimmerman
Assistant Examiner—Enrique L Santiago
(74) Attorney, Agent, or Firm—Blakely, Sokoloff, Taylor & Zafman LLP

(57) ABSTRACT

A method and apparatus for organizing two and/or three-dimensional computer applications on a display in a three-dimensional viewing perspective. A two-dimensional bitmap is created for each respective computer application and applied to a three-dimensional geometry (i.e., primitive). In one embodiment, the three-dimensional geometry is a cube and each respective computer application is mapped onto a respective surface of the cube. The computer user has the ability to manipulate the orientation of the cube, via a computer mouse, for example, to view the different surfaces, and, thus, different computer applications mapped thereon. The user is further given the capability to manipulate or interact with each computer application on each respective surface of the cube. In another embodiment, two or more cubes could be employed for displaying the various computer applications running on the computer's processor. The user could also allocate a particular group or category of applications to each respective cube to accomplish different tasks.

26 Claims, 8 Drawing Sheets

METHOD AND APPARATUS FOR PRESENTING TWO AND THREE-DIMENSIONAL COMPUTER APPLICATIONS WITHIN A 3D META-VISUALIZATION

BACKGROUND OF THE INVENTION

1. Field of the Invention

The present invention relates generally to computer system applications, and, more particularly, to a method and apparatus for presenting two and three-dimensional computer applications in a 3D meta-visualization for organizing the display of such applications.

2. Description of the Related Art

Since the inception of personal computers, the sophistication of their processors has increased significantly. Initially, personal computers were typically limited to running only one computer application at a time, thus severely limiting the computer user's ability to perform multiple computer tasks in an efficient manner. However, with the increase in the sophistication of these processors, today's personal computers are able to run a multitude of computer applications simultaneously (i.e., multi-task), thus significantly increasing the productivity of the computer user.

To manage the vast number of computer applications running simultaneously, the personal computers of today typically run a Windows®-based operating system, which places each computer application in a corresponding application window. Such a Windows®-based operating system could be, for example, Windows® 95 by Microsoft Corp., which is a operating system used by a significant portion of personal computers today.

Referring to FIG. 1, a personal computer having such a Windows® environment maps a given computer application into an application window 110 on a computer display 130, such that the user interface with the computer application is encapsulated within the window 110. The computer user has the option via controls 140–160 to manipulate each respective application window 110 on the display 130. Such manipulation could result from actuating the MINIMIZE button 140 to minimize the size of the application window 110; actuating the MAXIMIZE button 150 to maximize the size of the application window 110; or closing the computer application altogether via the CLOSE button 160. The user can move the application window 110 by "dragging" the window 110 by its title bar 170 via a user-input device, such as a computer mouse (not shown). Additionally, the user can adjust the size of the application window 110 (i.e., make it larger or smaller) by manipulating a control 180 on the lower right-hand corner of the window 110 via the user-input device.

Although the current Windows® environment aids the computer user to manage a plurality of computer applications to some extent, it suffers from disadvantages as well. When a significant number of application windows 110 are present on the display 130, they tend to overlap (i.e., some of the windows obscure the view of the other windows). Quite often, a computer user will have to move, minimize or close one or more of the windows 110 that obscure a desired application window in order to view the desired window. This process of "shuffling" the windows 110 can be burdensome and time consuming to the user, thereby decreasing their efficiency in performing a particular computer task. Additionally, with the present Windows® environment, a user cannot group or categorize the application windows 110 according to a particular project or task to be performed by the user. Accordingly, the user, while only desiring to use a subset of the applications running on the computer, might have to "sift" through the undesired application windows 110 to retrieve the desired applications to perform a particular task.

The present invention is directed to overcoming, or at least reducing the effects of, one or more of the problems set forth above.

SUMMARY OF THE INVENTION

In one aspect of the present invention, a method is provided for organizing computer applications in a three-dimensional perspective. The method includes creating at least one two-dimensional bitmap for at least one computer application; creating at least one three-dimensional geometry; mapping bits from the at least one two-dimensional bitmap to the at least one three-dimensional geometry; and displaying the at least one three-dimensional geometry with the bits mapped thereon.

In another aspect of the present invention, an apparatus includes a processor capable of running at least one computer application. The apparatus further includes a sub-processor capable of creating at least one two-dimensional bitmap for at least one computer application running on the processor, creating at least one three-dimensional geometry, and mapping bits from the at least one two-dimensional bitmap to the at least one three-dimensional geometry. The apparatus further includes a display capable of displaying the at least one three-dimensional geometry with the at least one computer application mapped thereon.

BRIEF DESCRIPTION OF THE DRAWINGS

Other objects and advantages of the invention will become apparent upon reading the following detailed description and upon reference to the drawings in which.

Figure 1:
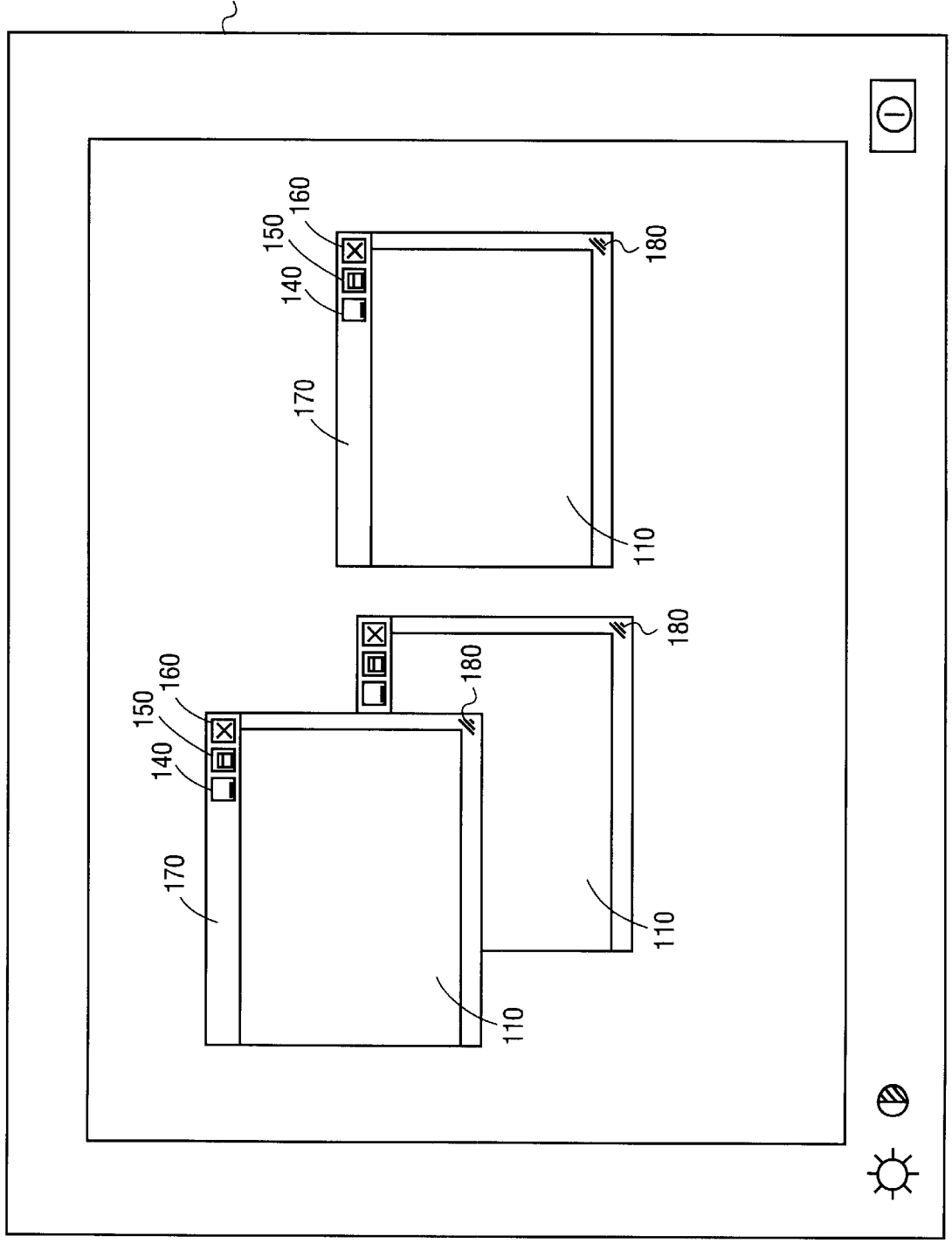
FIG. 1 illustrates a typical prior art Windows® environment for managing various computer program applications on a computer display.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that, even if such a development effort is complex and time-consuming, it would nonetheless be a routine undertaking for those of ordinary skill in the art having the benefit of this disclosure.

Figure 2:
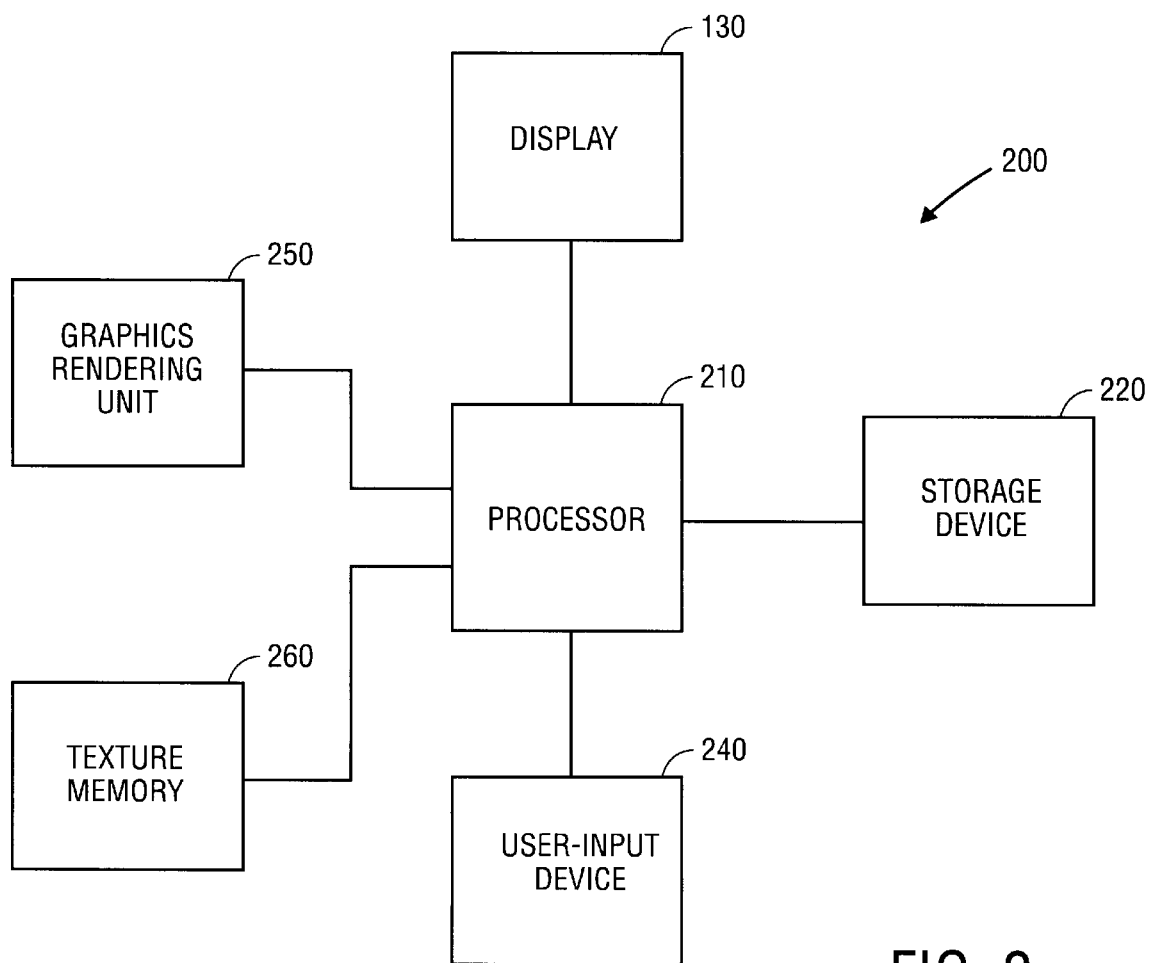
FIG. 2 is a block diagram of an apparatus for implementing the organization of multiple two and three-dimensional computer applications in a 3D meta-visualization.

Turning now to the drawings, and specifically referring to FIG. 2, a conventional apparatus 200 is shown. The apparatus 200 may be modified and programmed as discussed below to implement the invention to organize various two- and three-dimensional computer applications within a 3D meta-visualization. The apparatus 200 may be a conventional personal computer ("PC") available from a variety of manufacturers. The apparatus 200 comprises a processor 210, such as a Pentium® processor from Intel Corp., which can run the various two and three-dimensional computer applications based upon instructions from computer application programs stored in a storage device 220. The storage device 220 may be embodied as a combination of various devices, such as a disk drive for accessing the computer applications from a disk (e.g., a conventional floppy disk, CD-ROM, digital video disc "DVD", etc.), a hard drive, or the like. Alternatively, the computer applications may be accessed by the apparatus 200 via a communications medium (not shown) from some other computer source, such as a computer network, as opposed to being accessed from the storage device 220.

The different types of computer applications running on the processor 210 may be from a wide array of commercially available software. For example, the computer application may be text-based, such as word processing, spreadsheet, or e-mail applications, and, may also be two or three-dimensional graphics-based applications, such as computer games or design-related software. Of course, several other commercially available computer application programs could also run on the processor 210, and, thus, need not be limited to the aforementioned examples.

The processor 210 is capable of running a certain number of these computer applications simultaneously and displays such applications on a display 130 for visual presentation to a user. The apparatus 200 also includes a graphics rendering unit 250 for generating 2D or 3D graphics applications running on the processor 210 for output on the display 130. The 3D graphics rendering unit 250 has associated therewith a texture memory 260 for applying textural images to displayed graphics scenes, such as three-dimensional graphics scenes, for example. The manner in which the graphics rendering unit 250 and texture memory 260 create such graphics will be better understood as the detailed description proceeds.

The apparatus 200 further includes a user-input device 240, which permits the user to interact with the various computer applications running on the processor 210. In the illustrated embodiment, the user-input device 240 includes both a keyboard and a computer mouse. However, it will be appreciated that the user-input device 240 could be embodied as various other types of input devices, such as, for example, a trackball, touchpad, tablet, touchscreen, voice recognition via a microphone, joystick, etc. without departing from the spirit and scope of the present invention.

Figure 3:
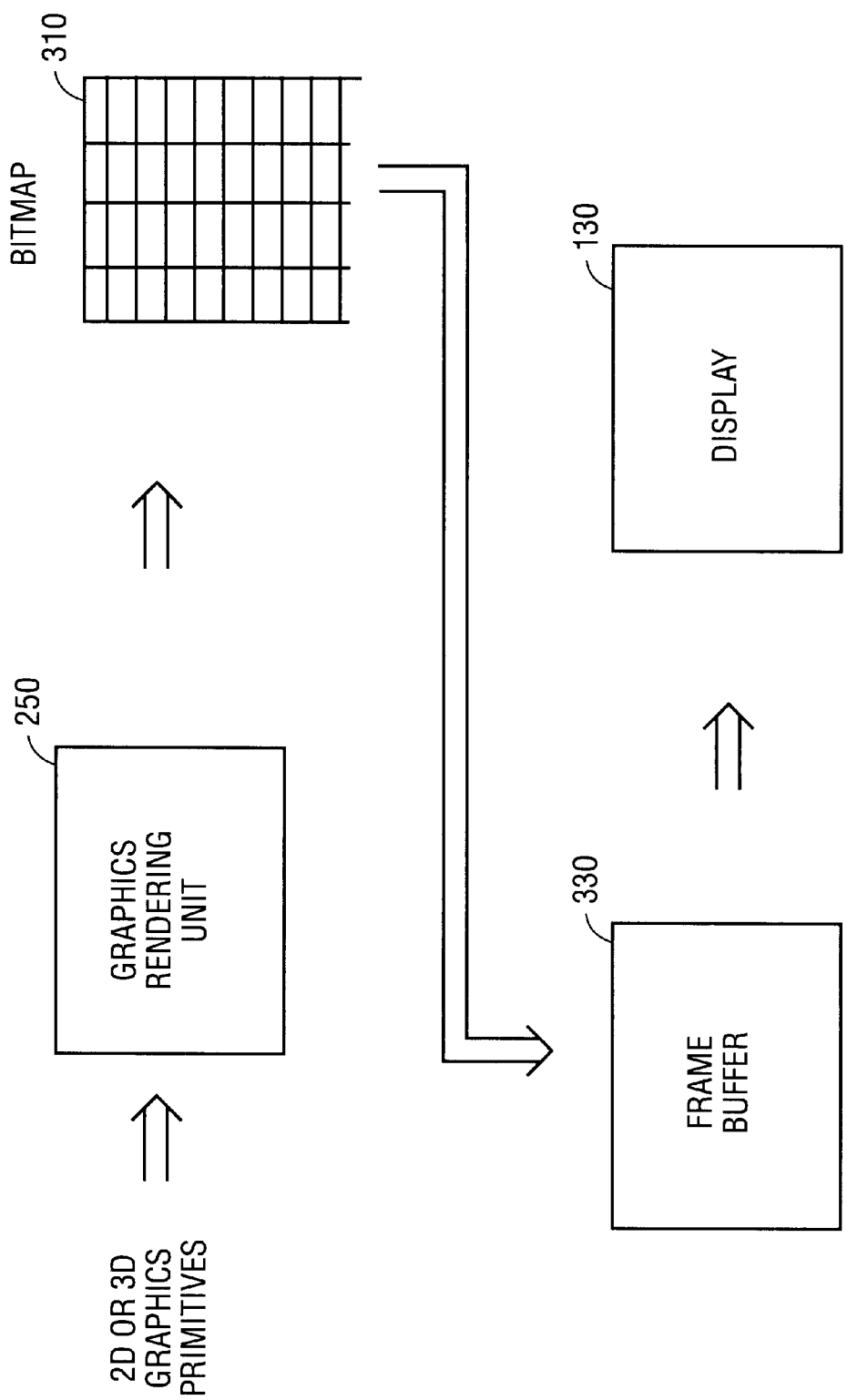
FIG. 3 shows a conventional prior art process for the display of a 2D and/or 3D application on a display screen.

Turning now to FIG. 3, a conventional process for displaying a two or three-dimensional application on the display 130 is shown. The processor 210 shown in FIG. 2, with the 2D or 3D application running thereon, generates 2D or 3D graphics primitives, and sends these primitives to the graphics rendering unit 250. The graphics rendering unit 250 then renders the 2D or 3D graphics onto a bitmap 310. The bitmap 310 is a two-dimensional array of pixels, which in this particular example represents the 2D or 3D computer application that is to be displayed on the display 130. When necessary, the processor 210 will apply or "draw" the bits from the bitmap 310 to a frame buffer 330 for displaying the 2D or 3D application on the display 130. Such instances when the processor 210 transfers these bits from the bitmaps 310 to the frame buffer 330 is upon initialization of the 2D or 3D application or when the application needs to be updated on the display 130. Updating of the displayed application could occur as a result of a predetermined action performed by the user via the user-input device 240 or as required by the 2D or 3D application itself. The process by which the processor 210 creates the bitmap 310 for each corresponding 2D or 3D application and transfers specific bits to the frame buffer 330 for displaying the application is well known to those of ordinary skill in the art. Accordingly, a more detailed process will not be discussed herein to avoid unnecessarily obscuring the present invention. Alternatively, it will be appreciated that certain applications would not require the formation of the bitmap 310, but the graphics rendering unit 250 may transfer the bits directly to the frame buffer 330.

For generating the 3D graphics, the graphics rendering unit 250 performs mathematical calculations, also in accordance with the prior art, from the 3D graphics application running on the processor 210, to determine how points within a 3D space correspond relative to the positioning of a "virtual camera" within such 3D space. The graphics rendering unit 250 then maps (i.e., projects) these points, representing the 3D space and the objects contained therein, onto the 2D bitmap 310. That is, the graphics rendering unit 250 will project the 3D space onto a 2D surface (i.e., the bitmap 310) for eventual display on the display 130. When necessary, the graphics rendering unit 250 will recalculate the points within the 3D space for changing the 3D scene displayed on the display 130. Such recalculation may occur as a result of the 3D graphics program running on the processor 210, or interaction with the 3D application program via the user-input device 240. The specific process by which the graphics rendering unit 250 calculates the points within the 3D space, projects these points onto the bitmap 310, and applies bits from the bitmap 310 to the frame buffer 330 for display of the 3D graphics scene is well known to those of ordinary skill in the art. Accordingly, a more detailed process will not be discussed herein to avoid unnecessarily obscuring the present invention.

Figure 4:
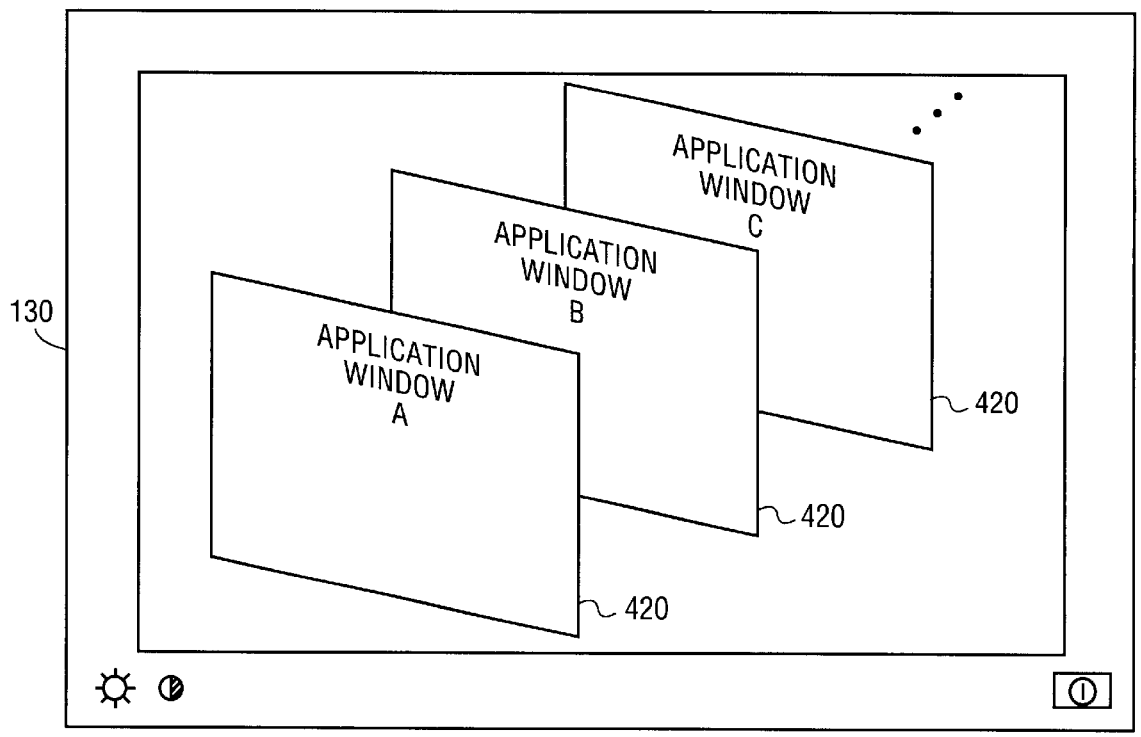
FIG. 4 shows a plurality of application windows that are mapped into a 3D meta-visualization in accordance with one embodiment of the present invention.

Turning now to FIG. 4, a perspective depicting the transformation of conventionally displayed application windows 110 to a 3D meta-visualization of the computer applications on the display 130 in accordance with the present invention is shown. The application windows 110 are conventionally generated on the display 130 via the process of FIG. 3, as previously discussed. The computer applications present within these conventional windows 110 could be either two or three-dimensional, and could essentially include any computer application program that is compatible with the processor 210. These application windows 110 would appear on the application workspace 120 of the computer display 130 similar to the arrangement as illustrated in FIG. 1.

To alleviate the aforementioned problems associated with the conventional Windows® environment, the present invention employs a technique for providing these conventional application windows 110 in a 3D meta-visualization. In accordance with one embodiment, these application windows 110 are mapped into a three-dimensional environment such that the contents of each window 110 are transformed into a respective "3D" application window 420 as shown on the display 130 of FIG. 4. To accomplish such 3D meta-visualization of the computer applications on the display 130, an "off-screen" rendering technique is employed where the bitmaps 310 of the two and three-dimensional applications are applied to the "3D" application windows 420.

In conventional 3D graphics, "texture" (i.e., images) from bitmaps in the texture memory 260 are mapped onto three-dimensional geometries, known as "primitives" generated by the graphics rendering unit 250. The process of applying this texture to such primitives, known as "rendering", is well established in the art. Accordingly, the specifics of such process of rendering will not be discussed herein to avoid unnecessarily obscuring the present invention.

Figure 5:
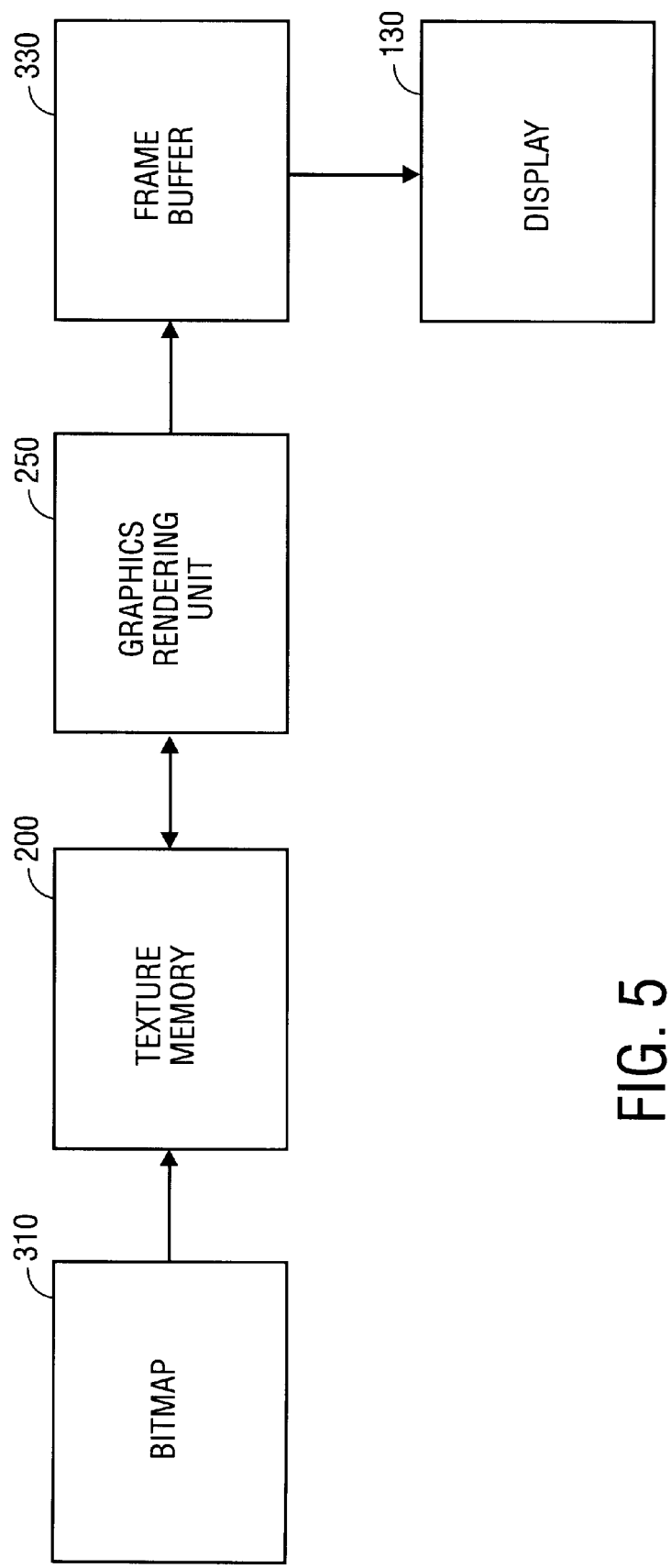
FIG. 5 illustrates a process for mapping the 2D or 3D applications in a 3D meta-visualization in accordance with the present invention.

FIG. 5 illustrates the technique of the present invention in one particular embodiment to apply the contents of the application windows 110 of FIG. 4 to the "3D" application windows 420 to implement such 3D meta-visualization. The bitmaps 310 from the two and three-dimensional computer applications (as obtained from the process of FIG. 3) are disposed in the texture memory 260 of the apparatus 200. The graphics rendering unit 250 generates a series of primitives for applying the bitmaps 310 of the two and three-dimensional computer applications that are to be mapped thereunto. In one embodiment, the primitives generated by the graphics rendering unit 250 are a series of "planes" as shown by the 3D application windows 420 in FIG. 4. However, it will be appreciated that the 3D graphics rendering unit 250 could generate other 3D geometries (i.e., different polygonal-shaped primitives) for mapping the applications thereon and not necessarily limited to the 3D planes as shown in FIG. 4.

Once the three-dimensional geometries are generated, the graphics rendering unit 250 applies the bits from a particular bitmap 310 (corresponding to a particular 2D or 3D computer application) to a surface of the 3D geometry (e.g., the plane 420) using the conventional graphics rendering technique as previously discussed. The graphics rendering unit 250 then transfers the "3D" application window 420 to the frame buffer 330 for subsequent display on the display 130.

The mapping between the bitmaps 310 (of one coordinate space) and the "3D" application windows 420 (of another coordinate space) by the graphics rendering unit 250 occurs bi-directionally. When the user interacts with the computer application of the "3D" window 420, the computer application itself will know the precise point of manipulation as if the user had interacted with the same computer application as if it appeared in a conventional application window 110. That is, as the graphics rendering unit 250 is able to map particular points onto the "3D" window 420, it can also map particular points of the "3D" window 420 back into the bitmap 310. Therefore, if the user interacts with the computer application at a particular point within the "3D" window 420, the graphics rendering unit 250 will be able to translate this point to the corresponding point of the associated bitmap 310 for processing by the corresponding computer application to that bitmap 310. The manner in which the graphics rendering unit 250 accomplishes such bi-directional mapping is well known to those of ordinary skill in the art. Accordingly, the specifics of such process will not be disclosed herein to avoid unnecessarily obscuring the present invention.

In typical operation, the user interacts with the "3D" window 420 utilizing the user-input device 240 (e.g., a pointing device such as a mouse). As practiced in the art of 3D graphics programming, the present invention can process the 2D events generated by the user-input device 240 and project their 2D position into the 3D graphical space to detect when the pointer (from the user-input device 240) is over the 3D object textured with the application window 110. This "ray-picking" process can identify not only the 3D object, but can also determine the pointer's position in the coordinates of the texture of the 3D geometry to which it is applied. Since this 2D texture coordinate corresponds directly to the 2D coordinates of the application window 110, the present invention can easily synthesize another pointer event, this time in the coordinate space of the application window 110, and send that event to that window, as is well known in the art of 2D graphical user interface programming. When the application window 110 receives this event, it will typically behave as if the pointer event occurred over the actual window 110, when in fact it originally occurred in the "3D" application window 420. If the event causes any change to the appearance of the application, then the bitmap 310 and correspondingly the texture is updated.

Figure 6:
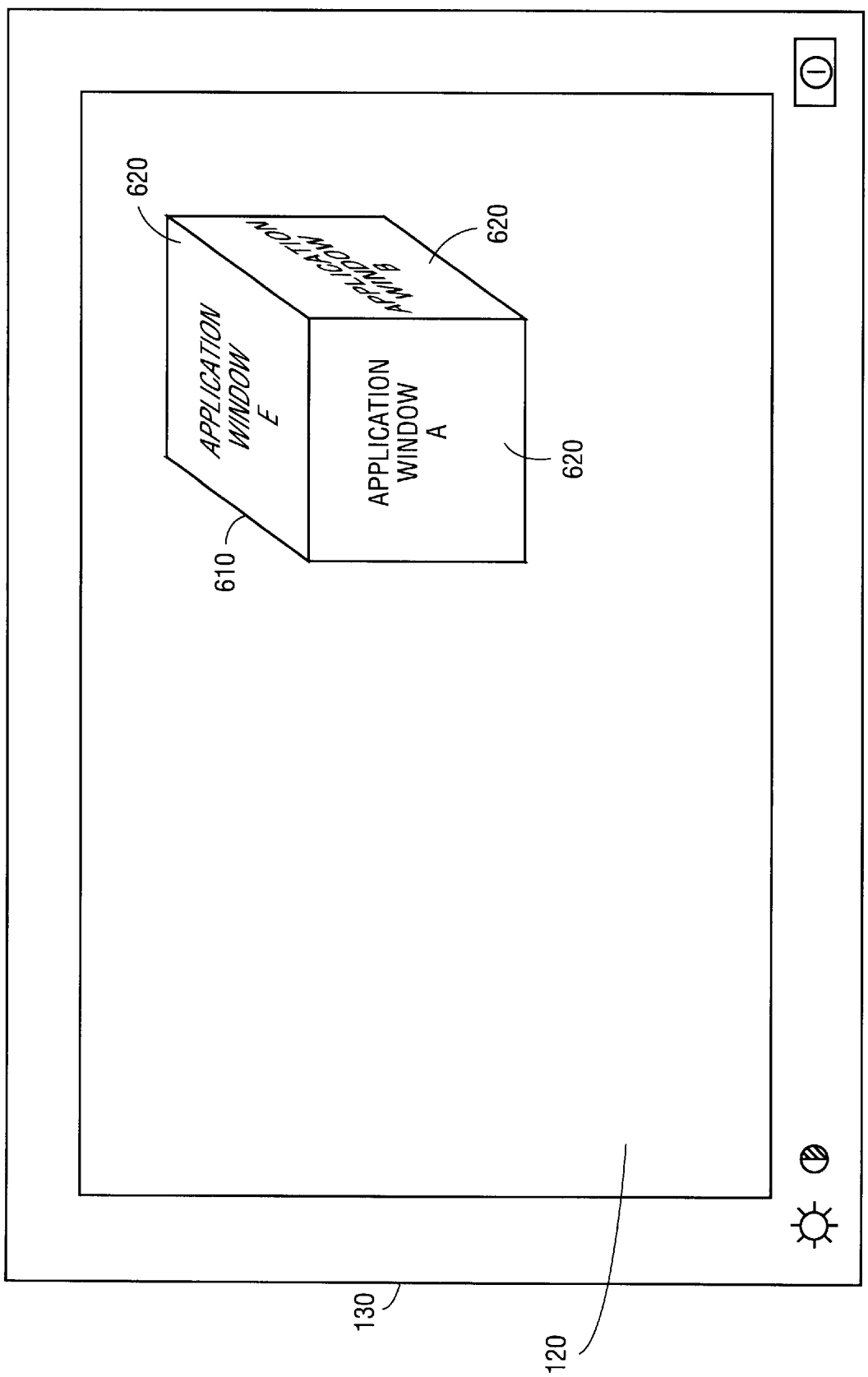
FIG. 6 shows the mapping of a plurality of applications on a three-dimensional geometry in accordance with another embodiment of the present invention.

Turning now to FIG. 6, an alternative embodiment of the 3D meta-visualization is shown. In this particular embodiment, the contents of the bitmaps 310 could be mapped onto the surfaces 620 of a three-dimensional cube 610 by the graphics rendering unit 250. The user could view all the surfaces 620 of the cube 610, and, thus, all of the computer applications mapped thereon, by rotating the cube 610 in a predetermined direction via the user-input device 240. This may be accomplished by receiving a first predetermined input at the user-input device 240 to cause the cube 610 to rotate horizontally. Or, alternatively, receiving a second predetermined input that may cause the cube 610 to rotate vertically. Such rotation could be accomplished by animating the movement of the cube 610 either horizontally or vertically, which could be achieved using techniques that are well established in the art of computer graphics.

The 3D cube 610 could appear anywhere within an application workspace 120 of the display 130. The user could further have the option to move the cube 610 anywhere within the application workspace 120 by "dragging" the cube 610 via the user-input device 240, if so desired. The user could also cause one of the application windows 620 of the cube 610 to occupy the entire application workspace 120, by performing a predetermined input via the user-input device 240. For example, by performing a right mouse button click via the user-input device 240 on one of the surfaces 620 of the cube 710, may cause the computer application appearing on that surface 620 to occupy the entire application workspace 120 of the display 130. The user could then subsequently reallocate that particular application back to one of the surfaces 620 of the cube 610 by right "clicking" on the application (in the application workspace 120) and, then, right "clicking" again on a surface 620 of the cube 610.

The user could also be provided with the capability to have the cube 610 essentially "fold-out" into two-dimensions, such that the application workspace 120 of the display 130 is divided equally into six windows, with each of the six surfaces 620 of the cube 610 being present in each respective window. The user could then have the two-dimensional representation of the six application windows "fold-up" into the three-dimensional cube 610 for conserving work space on the display 130.

Figure 7:
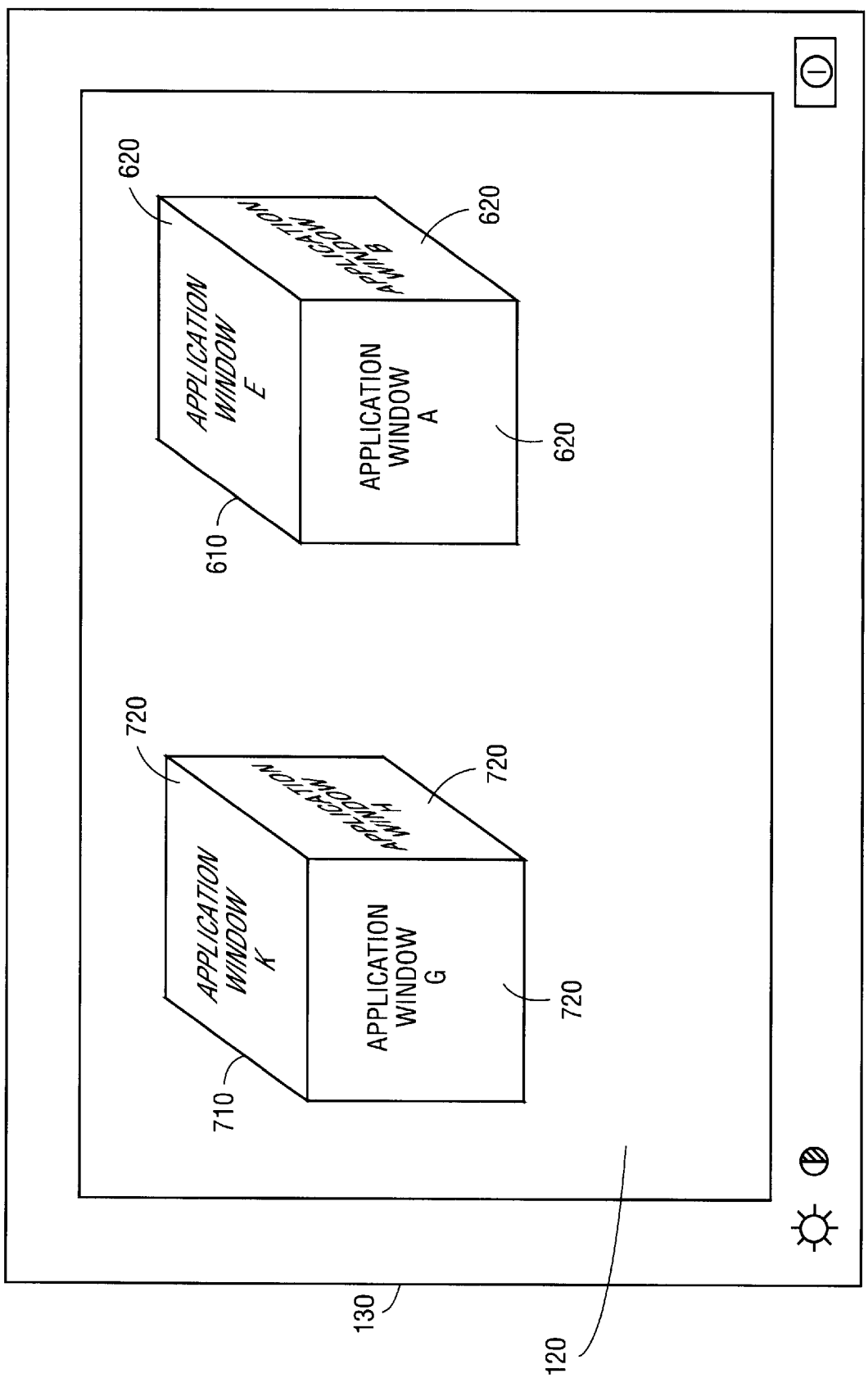
FIG. 7 shows a plurality of three-dimensional geometries upon which the application windows are mapped to permit distinct groupings of computer applications in accordance with yet another embodiment of the present invention.

Referring to FIG. 7, instead of having one cube 610 displayed, an additional cube 710 can also be provided to arrange various other computer applications on its surfaces 720. Although the cubes 610, 710 are shown in the illustrated embodiment, it will be appreciated that other three-dimensional geometries could be used in lieu thereof and not necessarily be limited to a cube. It will be further appreciated that any number of cubes 610, 710 (or other 3D geometries) could be used and need not necessarily be limited to two.

The use of multiple cubes 610, 710 permits the user to group and, thus, organize the various computer applications running on the processor 210. For example, the applications appearing on the surfaces 620 of the cube 610 could be applications pertaining to the user's preparation of a trip expense report. That is, one of the surfaces 620 could include a spreadsheet application for itemizing various expenses during the trip. Another surface 620 may contain a word processing document for actually preparing the report. And, other surfaces 620 may include e-mails pertaining to the trip. With such an arrangement on the cube 610, the user would have quick access to all of the computer applications necessary to complete his or her trip report. That is, while the user is typing the report in the word processing application, he or she could quickly access the spreadsheet itemizing the various expenses of the trip, and, perhaps, cut and paste these itemized expenses from the spreadsheet to the word processing document with relative ease. The cube 710, on the other hand, could be used to organize the user's e-mail application. For example, one of the surfaces 720 of the cube 710 may be used to display the list of the user's "received" e-mail, while other surfaces 420 may include "sent", "draft", etc. e-mails.

Figure 8:
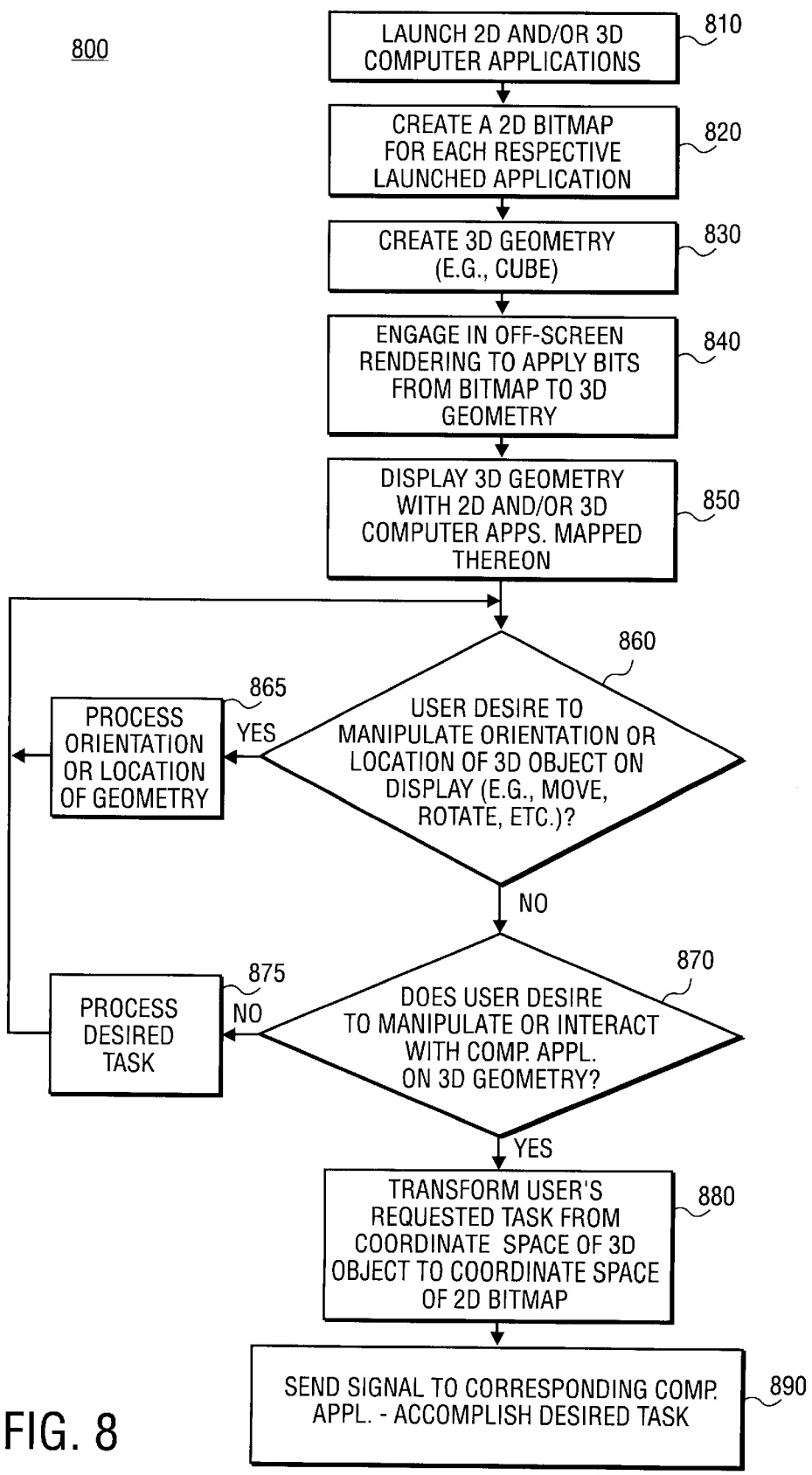
FIG. 8 depicts a flowchart implemented by a processor for mapping the various computer applications in a 3D meta-visualization in accordance with one embodiment of the present invention.

Turning now to FIG. 8, a process 800 executed by the processor 210 for implementing a 3D meta-visualization in one particular embodiment is shown. The process 800 commences at step 810 where the processor 210 launches a plurality of computer applications as designated by the user via the user-input device 240. For example, the user may elect to simultaneously run on the processor 210 an e-mail application, a word processing application, and a graphics-based application, etc. A bitmap 310 for each respective launched computer application is created at step 820. At step 830, the processor 210 summons the graphics rendering unit 250 to create a 3D geometry to map a particular application to a particular surface of the geometry. The 3D geometry could take the form of any one of various three-dimensional geometries. For example, it may take the form of a plane as shown by the application windows 420 of FIG. 4. Or, perhaps, could take the form of a cube 610 as shown in FIG. 6. The user could be given the option to select the particular 3D geometry, to have the applications mapped thereupon, via a "pull-down" menu, if so desired.

At step 840, the graphics rendering unit 250 engages in an off-screen rendering process to apply (i.e., texture) the bitmap 310 that corresponds to a particular launched application onto the 3D geometry. The manner in which the processor 210 accomplishes such off-screen rendering is accomplished by disposing the bitmaps 310 into the texture memory 260 and applying bits from the desired bitmaps 310 to a 3D geometry created by the graphics rendering unit 250.

The 3D geometry is then displayed on the display 130 with the 2D and/or 3D computer applications mapped thereon at step 850. The user can view the different 2D or 3D applications on the 3D geometry by manipulating the orientation of the geometry on the display 130. For example, if the 3D object were a cube, the user could have the cube rotate either horizontally or vertically to view all sides of the cube. The manner in which the user could cause such manipulation of the cube could be by providing predetermined inputs to the processor 210 via the user-input device 240. If the user desires to manipulate the orientation of the 3D cube, the process continues to step 865, where the processor 210 re-orients the 3D geometry to the user's preference. If not, the process 800 continues to step 870, where it is determined whether the user desires to manipulate or interact with a particular computer application mapped on the 3D geometry. If not, at step 875, the desired task is processed by the processor 210 and the process 800 reverts back to step 860. If the user desires to interact with a particular computer application in step 870, the process 800 continues to step 880, where the user's requested task is transformed from the coordinate space of the 3D geometry to the coordinate space of the 2D bitmap 310. Subsequently, at step 890, the desired task is processed by sending a signal to the corresponding computer application.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:

launching at least one computer application in a windowing graphical user interface environment comprising three-dimensional windows;

creating at least one two-dimensional bitmap of the at least one launched computer application;

creating at least one three-dimensional geometry comprising a number of surfaces; and mapping bits from said at least one two dimensional bitmap of the at least one launched computer application onto at least one of the number of surfaces of said at least one three-dimensional geometry;

displaying, as a three-dimensional window in the windowing graphical user interface environment, said at least one three-dimensional geometry with the bits from the at least one two-dimensional bitmap of the at least one launched computer application mapped onto at least one surface of the three-dimensional geometry; and editing data of the at least one launched computer application, wherein the editing is performed on the at least one surface on which the at least one launched computer application was mapped.

2. The method of claim 1 wherein the editing comprises:
issuing a command to said at least one launched computer application via a user-input device; and
translating said command from a coordinate space of said three-dimensional geometry to a coordinate space of said two-dimensional bitmap.

3. The method of claim 2, further comprising:
sending said translated command to said at least one launched computer application.

4. The method of claim 1, further comprising:
altering the displayed orientation of said three-dimensional geometry from a first orientation to a second orientation in response to a first predetermined input received by a user-input device.

5. The method of claim 1, wherein said creating at least one three-dimensional geometry further comprises creating a three-dimensional geometry selected from the group of a cube and a plane-like shaped geometry.

6. The method of claim 5, wherein said mapping bits is performed such that each of said at least one launched computer applications occupies a respective surface of said cube-shaped geometry.

7. A method comprising:
rendering a two-dimensional bitmap of a launched software application onto a three-dimensional geometry;
displaying the rendered three-dimensional geometry of the launched software application;
issuing an interactive editing command to said launched software application while said launched software application is displayed on the three-dimensional geometry, wherein the issuing is performed by placing a user input pointer over a portion of the displayed three-dimensional geometry; and
editing data of the at least one launched computer application based on the interactive editing command, wherein the editing is performed on the at least one surface on which the at least one launched computer application was mapped.

8. The method of claim 7, further comprising:
translating said interactive editing command from a coordinate space of said three-dimensional geometry to a coordinate space of said two-dimensional bitmap.

9. The method of claim 8, further comprising:
sending said translated command to said at least one launched computer application.

10. The method of claim 7, further comprising:
altering the displayed orientation of said three-dimensional geometry from a first orientation to a second orientation in response to a first predetermined input received by a user-input device.

11. The method of claim 7, wherein said rendering a two-dimensional bitmap for the launched software application onto a three-dimensional geometry further comprises rendering said two-dimensional bitmap onto a 3D geometry selected from the group of a cube and a plane-like shaped 3D geometry.

12. The method of claim 11, further comprising:
mapping bits form said two-dimensional bitmap to a respective surface of said cube-shaped geometry such that said launched software application occupies the respective surface of said cube-shaped geometry.

13. An apparatus, comprising:
a processor to execute at least one launched computer application comprising data, and to create at least one two-dimensional bitmap of said at least one launched computer application;
a graphics rendering unit to create at least one three-dimensional geometry, and to map bits from said at least one two-dimensional bitmap of said at least one launched computer application onto at least one of the number of surfaces of said at least one three-dimensional geometry;
a display to display said at least one three-dimensional geometry with said at least one launched computer application mapped thereon; and
a user input device to receive input and to cause editing of said data of the at least one launched computer application, wherein the editing is performed on the at least one surface on which the at least one launched computer application was mapped.

14. The apparatus of claim 13, wherein said processor to issue a command to said at least one launched computer application on said three-dimensional geometry, and to translate said command from a coordinate space of said three-dimensional geometry to a coordinate space of said two-dimensional bitmap.

15. The apparatus of claim 14, wherein said processor to send said command to said at least one launched computer application displayed on said three-dimensional geometry.

16. The apparatus of claim 13, further comprising a user-input device and wherein said sub-processor to change the displayed orientation of said three-dimensional geometry in response to a first predetermined input received by said processor via said user-input device.

17. The apparatus of claim 13, wherein said at least one three-dimensional geometry comprises at least one from the group of a plane-like shaped 3D geometry and a cube-shaped geometry.

18. The apparatus of claim 17, wherein said graphics rendering unit to apply bits from said at least one bitmap to each respective surface of said cube-shaped geometry such that each of said at least one launched computer applications occupies a respective surface of said cube-shaped geometry.

19. An apparatus, comprising:
means for launching at least one computer application in a windowing graphical user interface environment;
means for creating at least one two-dimensional bitmap of the at least one launched computer application;
means for creating at least one three-dimensional geometry comprising a number of surfaces;
means for mapping bits from said at least one two-dimensional bitmap of the at least one launched computer application onto at least one of the number of surfaces of said at least one three-dimensional geometry;
means for displaying, as a three-dimensional window in the windowing graphical user interface environment, said at least one three-dimensional geometry with the bits from the at least one two-dimensional bitmap of the at least one launched computer application mapped onto at least one surface of the three-dimensional geometry; and
means for editing data of the at least one launched computer application, wherein editing is performed on the at least one surface on which the at least one launched computer application was mapped.

20. A program storage device programmed with instructions that, when executed by a computer, performs the method comprising:
launching at least one computer application in a windowing graphical user interface environment;
creating at least one two-dimensional bitmap of the at least one launched computer application;

creating at least one three-dimensional geometry comprising a number of surfaces;

mapping bits from said at least one two-dimensional bitmap of the at least launched one computer application onto at least one of the number of surfaces of said at least one three-dimensional geometry;

displaying, as a three-dimensional window in the windowing graphical user interface environment, said at least one three-dimensional geometry with said bits from the at least one two-dimensional bitmap of the at least one launched computer application mapped onto at least one surface of the three-dimensional geometry; and editing data of the at least one launched computer application, wherein the editing is performed on the at least one surface on which the at least one launched computer application was mapped.

21. The program storage device of claim 20, further comprising:

issuing an interactive editing command to said at least one launched computer application mapped on said three-dimensional geometry via a user-input device; and translating said interactive command from a coordinate space of said three-dimensional geometry to a coordinate space of said two-dimensional bitmap.

22. The program storage device of claim 21, further comprising:

sending said translated command to said at least one launched computer application.

23. The program storage device of claim 20, further comprising:

altering the displayed orientation of said three-dimensional geometry from a first orientation to a second orientation in response to a first predetermined input received by a user-input device.

24. The program storage device of claim 20, wherein said creating at least one three-dimensional geometry further comprises creating a 3D geometry selected from the group of a cube and a plane-like shaped geometry.

25. The program storage device of claim 24, further comprising:

mapping bits from said at least one bitmap to each respective surface of said cube-shaped geometry such that each of said at least one launched computer applications occupies a respective surface of said cube-shaped geometry.

26. The apparatus of claim 19, further comprising means for altering the displayed orientation of said three-dimensional geometry from a first orientation to a second orientation in response to a first predetermined input received by a user-input device.

* * * * *

UNITED STATES PATENT AND TRADEMARK OFFICE
CERTIFICATE OF CORRECTION

PATENT NO.   : 6,597,358 B2
DATED        : July 22, 2003
INVENTOR(S)  : Miller

It is certified that error appears in the above-identified patent and that said Letters Patent is hereby corrected as shown below:

Delete all claims, and insert claims --

1. A method comprising:

launching at least one computer application in a windowing graphical user interface environment comprising three-dimensional windows;

creating at least one two-dimensional bitmap of the at least one launched computer application;

creating at least one three-dimensional geometry comprising a number of surfaces;

mapping bits from a coordinate space of said at least one two dimensional bitmap of the at least one launched computer application onto at least one of the number of surfaces in a coordinate space of said at least one three-dimensional geometry;

displaying, as a three-dimensional window in the windowing graphical user interface environment, said at least one three-dimensional geometry with the bits from the at least one two-dimensional bitmap of the at least one launched computer application mapped onto at least one surface of the three-dimensional geometry; and translating bits form the coordinate space of the three-dimensional geometry to the coordinate space of the two-dimensional bitmap based on an edit command for editing data in the coordinate space of the three-dimensional geometry of the at least one launched computer application, wherein the editing is performed on the at least one surface on which the at least one launched computer application

UNITED STATES PATENT AND TRADEMARK OFFICE
CERTIFICATE OF CORRECTION

PATENT NO. : 6,597,358 B2
DATED : July 22, 2003
INVENTOR(S) : Miller

It is certified that error appears in the above-identified patent and that said Letters Patent is hereby corrected as shown below:

was mapped.

2. The method of claim 1 wherein the editing comprises:

issuing a command to said at least one launched computer application via a user-input device; and translating said command from a coordinate space of said three-dimensional geometry to a coordinate space of said two-dimensional bitmap.

3. The method of claim 2, further comprising:

sending said translated command to said at least one launched computer application.

4. The method of claim 1, further comprising:

altering the displayed orientation of said three-dimensional geometry from a first orientation to a second orientation in response to a first predetermined input received by a user-input device.

5. The method of claim 1, wherein said creating at least one three-dimensional geometry further comprises creating a three-dimensional geometry selected from the group of a cube and a plane-like shaped geometry.

6. The method of claim 5, wherein said mapping bits is performed such that each of said at least one launched computer applications occupies a respective surface of said cube-shaped geometry.

7. A method comprising:

rendering a two-dimensional bitmap of a launched software application into a coordinate space of a three-dimensional geometry;

displaying the rendered three-dimensional geometry of the launched software application;

issuing an interactive editing command to said launched software application

UNITED STATES PATENT AND TRADEMARK OFFICE
CERTIFICATE OF CORRECTION

PATENT NO.       : 6,597,358 B2
DATED            : July 22, 2003
INVENTOR(S)  : Miller It is certified that error appears in the above-identified patent and that said Letters Patent is hereby corrected as shown below:

while said launched software application is displayed on the three-dimensional geometry, wherein the issuing is performed by placing a user input pointer over a portion of the displayed three-dimensional geometry; and editing data in the coordinate space of the three-dimensional geometry of the at least one launched computer application based on the interactive editing command, wherein the editing is performed on the at least one surface on which the at least one launched computer application was mapped.

8. The method of claim 7, further comprising:

translating said interactive editing command from the coordinate space of said three-dimensional geometry to a coordinate space of said two-dimensional bitmap.

9. The method of claim 8, further comprising:

sending said translated command to said at least one launched computer application.

10. The method of claim 7, further comprising:

altering the displayed orientation of said three-dimensional geometry from a first orientation to a second orientation in response to a first predetermined input received by a user-input device.

11. The method of claim 7, wherein said rendering a two-dimensional bitmap for the launched software application onto a three-dimensional geometry further comprises rendering said two-dimensional bitmap onto a three-dimensional geometry selected from the group of a cube and a plane-like shaped three-dimensional geometry.

12. The method of claim 11, further comprising:

mapping bits form said two-dimensional bitmap to a respective surface of said cube-shaped geometry such that said launched software application occupies the respective surface of said cube-shaped geometry.

UNITED STATES PATENT AND TRADEMARK OFFICE
CERTIFICATE OF CORRECTION

PATENT NO. : 6,597,358 B2
DATED : July 22, 2003
INVENTOR(S) : Miller

It is certified that error appears in the above-identified patent and that said Letters Patent is hereby corrected as shown below:

13. An apparatus, comprising:

a processor to execute at least one launched computer application comprising data, and to create at least one two-dimensional bitmap of said at least one launched computer application;

a graphics rendering unit to create at least one three-dimensional geometry, and to map bits from said at least one two-dimensional bitmap of said at least one launched computer application onto at least one of the number of surfaces in a coordinate space of said at least one three-dimensional geometry;

a display to display said at least one three-dimensional geometry with said at least one launched computer application mapped thereon; and a user input device to receive input and to cause editing of said data in the coordinate space of the three-dimensional geometry of the at least one launched computer application, wherein the editing is performed on the at least one surface on which the at least one launched computer application was mapped.

14. The apparatus of claim 13, wherein said processor to issue a command to said at least one launched computer application on said three-dimensional geometry, and to translate said command from a coordinate space of said three-dimensional geometry to a coordinate space of said two-dimensional bitmap.

15. The apparatus of claim 14, wherein said processor to send said command to said at least one launched computer application displayed on said three-dimensional geometry.

16. The apparatus of claim 13, further comprising a user-input device and wherein said sub-processor to change the displayed orientation of said three-dimensional geometry in response to a first predetermined input received by said processor via said user-input device.

17. The apparatus of claim 13, wherein said at least one three-dimensional geometry comprises at least one from the group of a plane-like shaped three-dimensional geometry and a cube-shaped geometry.

18. The apparatus of claim 17, wherein said graphics rendering unit to apply bits

UNITED STATES PATENT AND TRADEMARK OFFICE
CERTIFICATE OF CORRECTION

PATENT NO. : 6,597,358 B2
DATED : July 22, 2003
INVENTOR(S) : Miller

It is certified that error appears in the above-identified patent and that said Letters Patent is hereby corrected as shown below:

from said at least one bitmap to each respective surface of said cube-shaped geometry such that each of said at least one launched computer applications occupies a respective surface of said cube-shaped geometry.

19. An apparatus, comprising:

means for launching at least one computer application in a windowing graphical user interface environment;

means for creating at least one two-dimensional bitmap of the at least one launched computer application;

means for creating at least one three-dimensional geometry comprising a number of surfaces;

means for mapping bits from a coordinate space of said at least one two-dimensional bitmap of the at least one launched computer application onto at least one of the number of surfaces in a coordinate space of said at least one three-dimensional geometry;

means for displaying, as a three-dimensional window in the windowing graphical user interface environment, said at least one three-dimensional geometry with the bits from the at least one two-dimensional bitmap of the at least one launched computer application mapped onto at least one surface of the three-dimensional geometry; and means for translating bits from the coordinate space of the three-dimensional geometry to the coordinate space of the two-dimensional bitmap based on an edit command for editing data in the coordinate space of the three-dimensional geometry of the at least one launched computer application, wherein editing is performed on the at least one surface on which the at least one launched computer application was mapped.

20. A program storage device programmed with instructions that, when executed by a computer, performs the method comprising:

launching at least one computer application in a windowing graphical user interface environment;

UNITED STATES PATENT AND TRADEMARK OFFICE
CERTIFICATE OF CORRECTION

PATENT NO.    : 6,597,358 B2
DATED         : July 22, 2003
INVENTOR(S)   : Miller It is certified that error appears in the above-identified patent and that said Letters Patent is hereby corrected as shown below:

creating at least one two-dimensional bitmap of the at least one launched computer application;

creating at least one three-dimensional geometry comprising a number of surfaces;

mapping bits from a coordinate space of said at least one two-dimensional bitmap of the at least launched one computer application onto at least one of the number of surfaces in a coordinate space of said at least one three-dimensional geometry;

displaying, as a three-dimensional window in the windowing graphical user interface environment, said at least one three-dimensional geometry with said bits from the at least one two-dimensional bitmap of the at least one launched computer application mapped onto at least one surface of the three-dimensional geometry; and translating bits from the coordinate space of the three-dimensional geometry to the coordinate space of the two-dimensional bitmap based on an edit command for editing data in the coordinate space of the three-dimensional geometry of the at least one launched computer application, wherein the editing is performed on the at least one surface on which the at least one launched computer application was mapped.

21. The program storage device of claim 20, further comprising:

issuing an interactive editing command to said at least one launched computer application mapped on said three-dimensional geometry via a user-input device; and translating said interactive command from a coordinate space of said three-dimensional geometry to a coordinate space of said two-dimensional bitmap.

22. The program storage device of claim 21, further comprising:

sending said translated command to said at least one launched computer application.

UNITED STATES PATENT AND TRADEMARK OFFICE
CERTIFICATE OF CORRECTION

PATENT NO.    : 6,597,358 B2
DATED         : July 22, 2003
INVENTOR(S)   : Miller It is certified that error appears in the above-identified patent and that said Letters Patent is hereby corrected as shown below:

23. The program storage device of claim 20, further comprising:

altering the displayed orientation of said three-dimensional geometry from a first orientation to a second orientation in response to a first predetermined input received by a user-input device.

24. The program storage device of claim 20, wherein said creating at least one three-dimensional geometry further comprises creating a 3D geometry selected from the group of a cube and a plane-like shaped geometry.

25. The program storage device of claim 24, further comprising:

mapping bits from said at least one bitmap to each respective surface of said cube-shaped geometry such that each of said at least one launched computer applications occupies a respective surface of said cube-shaped geometry.

26. The apparatus of claim 19, further comprising means for altering the displayed orientation of said three-dimensional geometry from a first orientation to a second orientation in response to a first predetermined input received by a user-input device. --

Signed and Sealed this

Thirteenth Day of April, 2004

JON W. DUDAS
*Acting Director of the United States Patent and Trademark Office*